US012181874B1

(12) United States Patent
Jones, Jr. et al.

(10) Patent No.: US 12,181,874 B1
(45) Date of Patent: Dec. 31, 2024

(54) SYSTEMS AND METHODS TO ENABLE MACHINES BY FORMING PARASITIC RELATIONSHIP

(71) Applicant: United Services Automobile Association (USAA), San Antonio, TX (US)

(72) Inventors: David M. Jones, Jr., San Antonio, TX (US); Megan S. Jennings, San Antonio, TX (US); Bradly J. Billman, Celina, TX (US); Sumita T. Jonak, San Antonio, TX (US); Priyadarshini Badugu, Frisco, TX (US); Justin R. Nash, Little Elm, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 353 days.

(21) Appl. No.: 17/827,536

(22) Filed: May 27, 2022

(51) Int. Cl.
*G05D 1/00* (2024.01)
*G07F 19/00* (2006.01)
*H04W 4/40* (2018.01)

(52) U.S. Cl.
CPC ........... *G05D 1/0088* (2013.01); *G07F 19/20* (2013.01); *H04W 4/40* (2018.02)

(58) Field of Classification Search
CPC .. B60L 11/1824; B60L 11/833; G08B 25/006; G07F 19/20; H04W 4/40
See application file for complete search history.

(56) References Cited

U.S. PATENT DOCUMENTS 10,467,885 B2 * 11/2019 Trundle ............. H04B 7/18504
2020/0285249 A1 * 9/2020 Woods ................. G05D 1/0246

\* cited by examiner

*Primary Examiner* — Peter D Nolan
*Assistant Examiner* — Luke Huynh
(74) *Attorney, Agent, or Firm* — BakerHostetler

(57) ABSTRACT

Autonomous vehicles may be terrestrial, aerial, nautical, or multi-mode and may be used to enable communications of other devices. For example, an autonomous vehicle may analyze information about a device outage and based on the information direct an autonomous vehicle to a location of the device to address the outage by adding a capability to the device.

20 Claims, 4 Drawing Sheets

SYSTEMS AND METHODS TO ENABLE MACHINES BY FORMING PARASITIC RELATIONSHIP

TECHNICAL FIELD

Systems, apparatuses, or methods enable machine communications by forming a parasitic relationship with the machine and an autonomous vehicle.

BACKGROUND

Autonomous vehicles (e.g., autonomous road vehicles or aerial vehicles) are known for their use in traditional roadway and urban settings. In traditional roadway settings, they are often used to transport human passengers or deliver goods. The use of autonomous vehicles can go far beyond the aforementioned examples, especially outside of a traditional roadway and urban settings. Businesses of all sorts are now developing innovative ways to use autonomous vehicles to benefit their business.

SUMMARY

Autonomous vehicles may be terrestrial, aerial, nautical, or multi-mode and may be used to enable communications of other devices. For example, an autonomous vehicle may analyze information about a device outage and based on the information direct an autonomous vehicle to a location of the device to address the outage by adding a capability to the device.

In an example, a vehicle may include a processor and a memory coupled with the processor that effectuates operations. The operations may include detecting an outage associated with a device; based on the outage, deploying an autonomous vehicle to a location near the device; and utilizing a function of the autonomous vehicle to provide a capability to the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

The disclosed subject matter may enable autonomously driven vehicles in diverse geographical locations to render automated outage recovery services for power outages, communication outages, or the like. Autonomous vehicles as well as the infrastructure to accommodate them are under development. The Society of Automotive Engineers (SAE) International has developed definitions for six levels of driving automation Levels 0-5. Levels 0-2 require a human driver to monitor the driving environment and levels 3-5 require an automated driving system to monitor the driving environment. Vehicles of levels 0-2 have an onboard control system for assisting a driver of a host vehicle in tracking adjacent vehicles. Existing driver assist systems include adaptive cruise control, forward collision warning, lane keeping and lane departure systems, and the like. These systems utilize input from sensors such as RADAR, LIDAR, LASER, and optical cameras to track vehicles surrounding the host vehicle. The onboard systems can take measures such as flashing a warning light on the dashboard, side-view or rear-view mirrors, or other display and by applying brakes to slow or stop the host vehicle. Vehicles of levels 3-5 are being tested on today's roads. There will be a gradual blend of varying levels of autonomous and non-autonomous vehicles.

Figure 1:
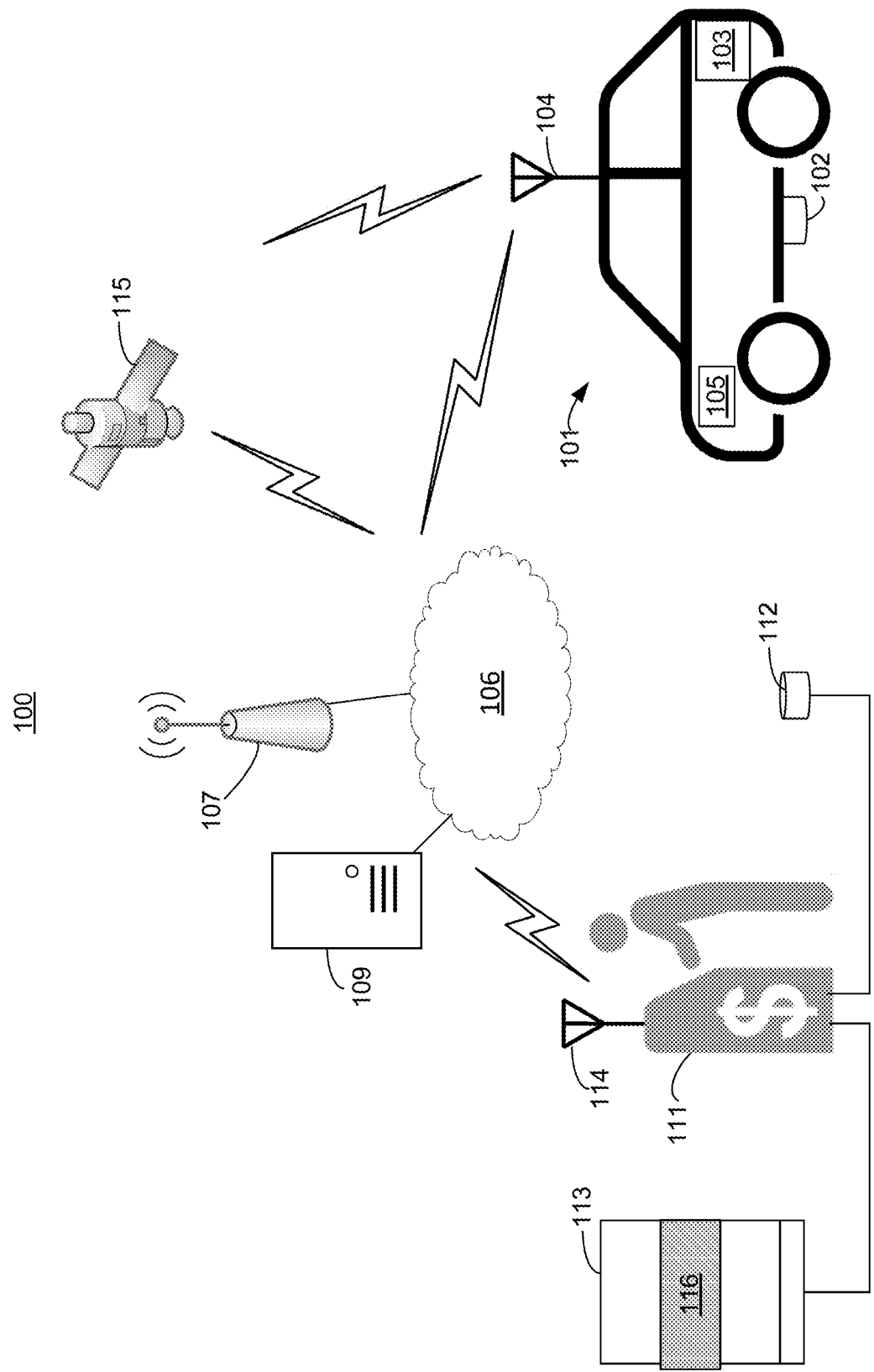
FIG. 1 illustrates an exemplary system that may enable machines based on a parasitic relationship.

FIG. 1 illustrates an exemplary method that may enable machines based on a parasitic relationship. System 100 may include a plurality of devices, such as autonomous vehicle 101, apparatus 111, base station 107, server 109, satellite 115, or server 109. The devices of system 100 may be communicatively connected with each other and network 106.

Apparatus 111 may be a low mobility device, such as an automated teller machine, a stationary sensor (e.g., motion sensor), or another device. Apparatus 111 may include wireless antenna 114 and connections (wired or wireless) to connector 112 or automated cabinet 113. Connector 112 may be a connection point for autonomous vehicle (AV) 101 to connect using connector 102, or the like for communication, power, or similar connections. Automated cabinet 113 may be considered an alternative to (or addition to) connector 112 and may be used to store communications, power, connectors, or similar equipment. In an example, AV 101 may replace depleted battery pack 116 of automated cabinet 113 or add an additional battery pack to automated cabinet 113 for main or backup power conditions.

AV 101 may include wireless antenna 104, connector 102, power generator 105 (e.g., green energy or fossil fuel-based energy) of AV 101, or automated storage compartment 103. Power generator 105 may be a fossil fuel-based energy source, solar based energy source, or another energy source that may help power AV 101 or apparatus 111 when AV 101 is connected with apparatus 111. Automated storage compartment 103 may be considered an alternative to (or addition to) connector 102 and may be used to store communications, power, or similar equipment that may be used to provide a capability to apparatus 111 which may resolve an outage of apparatus 111. In an example, AV 101 may use automated storage compartment 103 to connect with automated cabinet 113 and automatically replace or add battery packs, communication equipment, or the like capability to resolve an outage. Wireless antenna 104 may be a satellite base station, 5G base station, or another wireless technology. A satellite communication technology may be particularly relevant if apparatus 111 is located in a remote area and therefore wireless antenna 104 may connect with satellite 115 to restore communication or enhance communication for apparatus 111.

Figure 2:
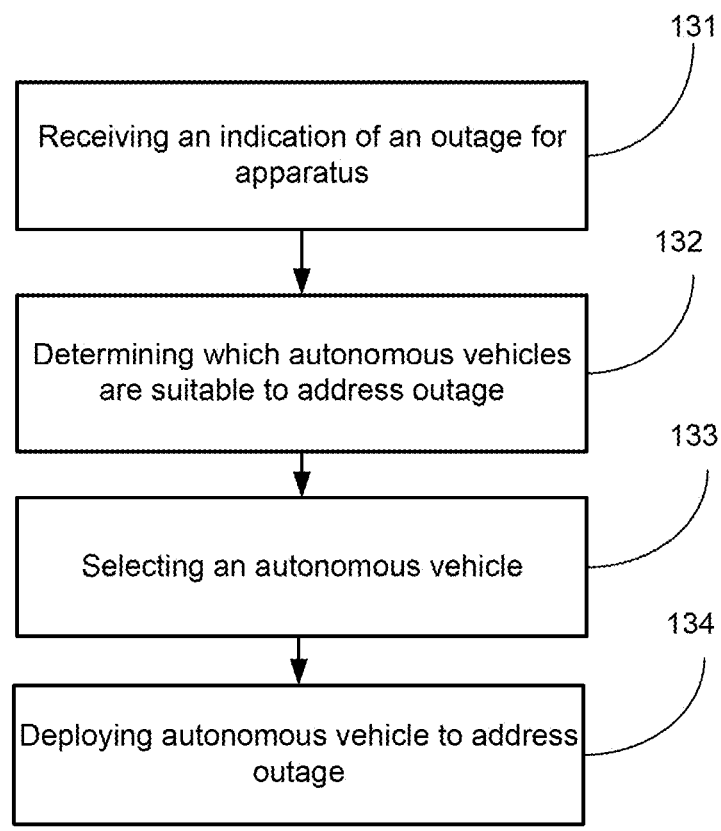
FIG. 2 illustrates an exemplary method that may enable machines based on a parasitic relationship.

FIG. 2 illustrates an exemplary method that may enable machines based on a parasitic relationship. At step 131, server 109 may receive an indication of an outage for apparatus 111. In an example, server 109 may not receive a response to a keepalive message, may receive a message based on nearby sensor to apparatus 111 detecting an outage, may receive an indication that apparatus 111 has switched to auxiliary power or communication, or may receive another indication of an outage.

At step 132, which AVs are suitable to address the outage may be determined. Suitability may depend on factors, such as nearest AV 101 to the location of the outage, type of equipment installed on AV 101 or other functionalities of AV 101, priority of outage, whether this a conflicting use of AV 101 at time of outage, or whether there is a possible conflicting subsequently scheduled use of AV 101 (e.g., prescheduled use of AV 101), among other things.

At step 133, AV 101 of a plurality of AVs may be selected based on the suitability. The plurality of AVs may be ranked based on the factors of step 132, and then selected by rank. At step 134, instructions may be sent to deploy AV 101 to use a function to address the outage. AV 101 may be dispatched to the location of apparatus 111 and use a detachable battery of automated storage compartment 103, a detachable antenna of automated storage compartment 103, connector 102, or the like to restore functionality of apparatus 111. Based on the type of outage multiple AVs may be scheduled to arrive at a certain time, in order to support resolution of the outage. In an example, a first AV 101 may be scheduled to provide power until it is nearly depleted (e.g., over 2 hours) and then a second AV 101 may be scheduled to provide power after the first AV 101. In another example, a first AV 101 may be scheduled to provide communications until the power supply of the first AV 101 is nearly depleted (e.g., over 2 hours) and then a second AV 101 may be scheduled to provide communications after the first AV 101. The disclosed steps may be distributed over multiple devices or conducted on one device.

Figure 3:
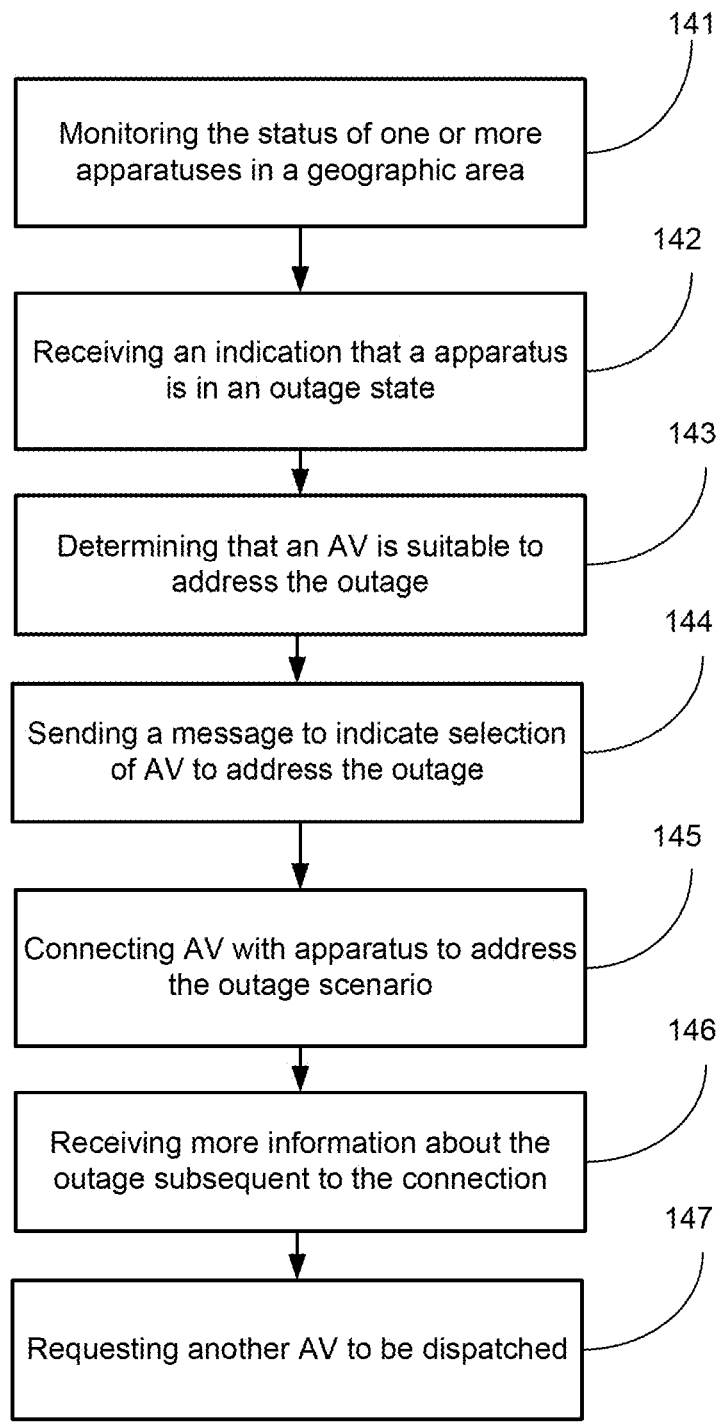
FIG. 3 illustrates an exemplary method that may enable machines based on a parasitic relationship.

FIG. 3 illustrates an exemplary method that may enable machines based on a parasitic relationship. At step 141, monitoring, by a plurality of AVs, such as AV 101, the status of one or more apparatuses 111 in a geographic area. The plurality of AVs may monitor overlapping geographic areas.

At step 142, receiving an indication that apparatus 111 of the one or more apparatuses is in an outage state. An outage may be determined by tracking beacons or keepalives of apparatus 111, receiving messages from sensors monitoring apparatus 111, or the like. In an example, an owner or other person may also call, e-mail, or otherwise communicate the type of outage for apparatus 111. At step 143, determining, by AV 101, that it has suitable functions to address the outage. Again, suitable, as disclosed herein, may include whether AV 101 is within a certain geographic region, whether AV 101 has functions (e.g., power or communication connections) to address the outage such that capabilities may be provided to apparatus 111.

At step 144, sending a message (e.g., a broadcast message) to indicate that AV 101 will address the outage. The message may be broadcast to nearby A Vs by AV 101, sent to server 109 which then appropriately multicasts to other AVs, or the like.

At step 145, connecting, by AV 101, with apparatus 111 to address the outage scenario. At step 146, AV 101 may connect with apparatus 111 and receive more information about the outage, which may help further diagnose the current outage or help to address future outages. The diagnosis may determine additional information, such as there is a need to back-up data of apparatus 111 or use AV 101's data connection due to errors or damage to an existing data connection or AV 101 having a faster data connection. At step 147, AV 101 may request another AV to be dispatched to the location alternative to (or in addition to) AV 101, if AV 101 determines it cannot handle one or more issues related to the outage.

With continued reference to FIG. 3, the distributed scenario in which each AV 101 may detect and decide may reduce the reaction time in responding to an outage scenario and may more fully utilize AVs that traditionally would just be used for passenger or package transport. It is contemplated that this subject matter may be particularly useful in remote areas or areas hit by disasters. It also contemplated that although AVs are referred to herein, unmanned vehicles may be used as well.

The present disclosure is directed to enabling machines, such as by a parasitic relationship. The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth. In addition, the use of the word "or" is generally used inclusively unless otherwise provided herein.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

It is to be appreciated that network 106 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 100, or portions thereof, may be stored in a remote memory storage device such as storage medium. Computing devices may communicate over network 106 through one or more communications links formed between data interfaces. Communication links may comprise either wired or wireless links. It is to be appreciated that the illustrated network connections in the figures (e.g., FIG. 1 or FIG. 4) are exemplary and other ways of establishing a communications link between multiple devices may be used.

Figure 4:
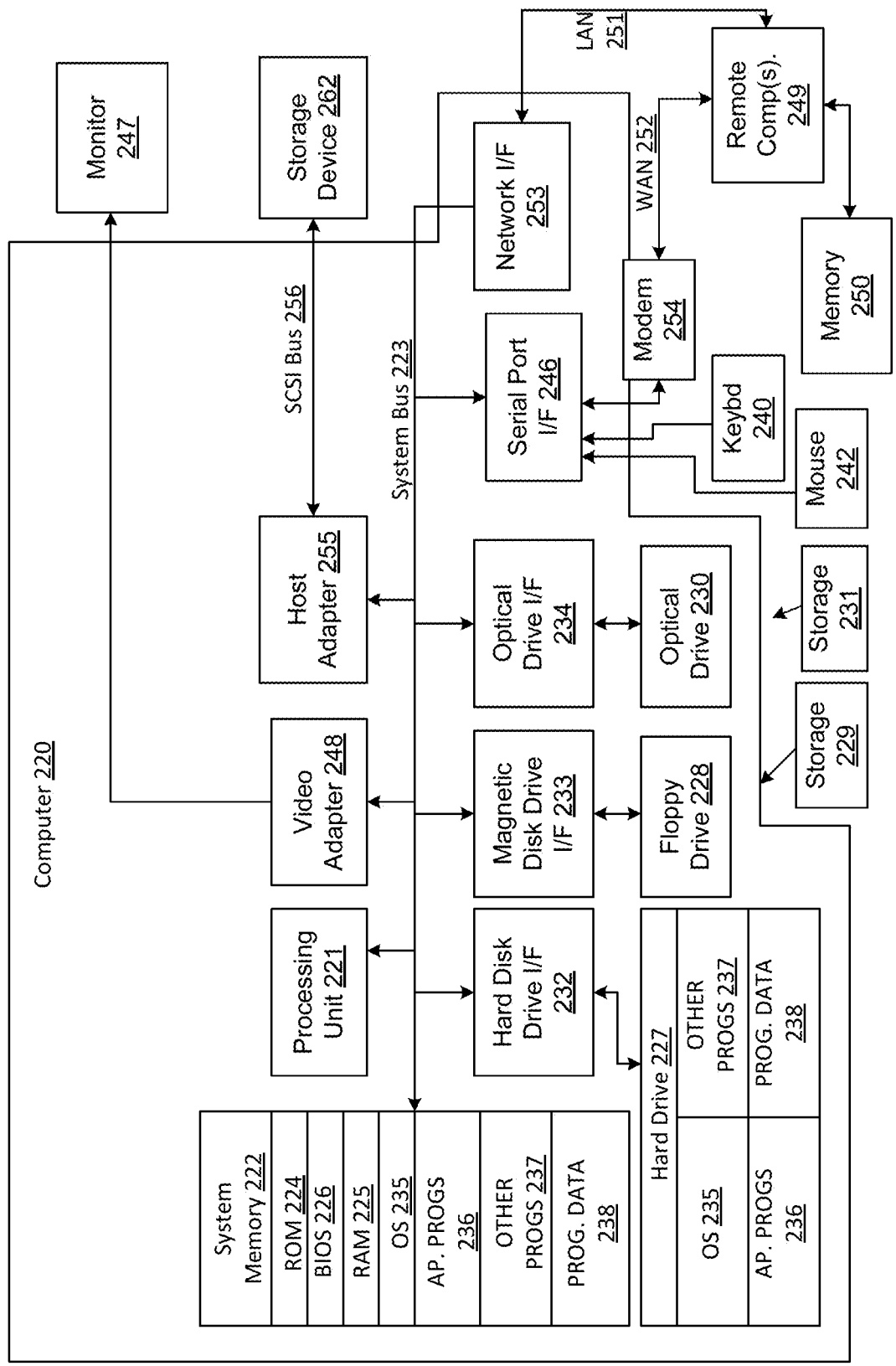
FIG. 4 is an exemplary block diagram representing a computer system in which aspects of the methods and systems disclosed herein or portions thereof may be incorporated.

FIG. 4 and the following discussion are intended to provide a brief general description of a suitable computing environment in which the methods and systems disclosed herein, or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips, or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices. It is contemplated that the disclosed steps associated with different Figures may be combined. Also, the steps may be distributed over multiple devices or performed primarily on one device.

FIG. 4 is a block diagram representing a computer system in which aspects of the methods and systems disclosed herein and/or portions thereof may be incorporated. As shown, the exemplary general purpose computing system includes a computer 220 or the like, including a processing unit 221, a system memory 222, and a system bus 223 that couples various system components including the system memory to the processing unit 221. The system bus 223 may be any of several types of bus structures including a memory bus or memory controller, a peripheral bus, and a local bus using any of a variety of bus architectures. The system memory includes read-only memory (ROM) 224 and random-access memory (RAM) 225. A basic input/output system 226 (BIOS), containing the basic routines that help to transfer information between elements within the computer 220, such as during start-up, is stored in ROM 224.

The computer 220 may further include a hard disk drive 227 for reading from and writing to a hard disk (not shown), a magnetic disk drive 228 for reading from or writing to a removable magnetic disk 229, and an optical disk drive 230 for reading from or writing to a removable optical disk 231 such as a CD-ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide non-volatile storage of computer readable instructions, data structures, program modules and other data for the computer 220. As described herein, computer-readable media is a tangible, physical, and concrete article of manufacture and thus not a signal per se.

Although the exemplary environment described herein employs a hard disk, a removable magnetic disk 229, and a removable optical disk 231, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random-access memory (RAM), a read-only memory (ROM), and the like.

A number of program modules may be stored on the hard disk, magnetic disk 229, optical disk 231, ROM 224 or RAM 225, including an operating system 235, one or more application programs 236, other program modules 237 and program data 238. A user may enter commands and information into the computer 220 through input devices such as a keyboard 240 and pointing device 242. Other input devices (not shown) may include a microphone, joystick, game pad, satellite disk, scanner, or the like. These and other input devices are often connected to the processing unit 221 through a serial port interface 246 that is coupled to the system bus, but may be connected by other interfaces, such as a parallel port, game port, or universal serial bus (USB). A monitor 247 or other type of display device is also connected to the system bus 223 via an interface, such as a video adapter 248. In addition to the monitor 247, a computer may include other peripheral output devices (not shown), such as speakers and printers. The exemplary system of FIG. 4 also includes a host adapter 255, a Small Computer System Interface (SCSI) bus 256, and an external storage device 262 connected to the SCSI bus 256.

The computer 220 may operate in a networked environment using logical connections to one or more remote computers, such as a remote computer 249. The remote computer 249 may be a personal computer, a server, a router, a network PC, a peer device, or other common network node, and may include many or all of the elements described above relative to the computer 220, although only a memory storage device 250 has been illustrated in FIG. 4. The logical connections depicted in FIG. 4 include a local area network (LAN) 251 and a wide area network (WAN) 252. Such networking environments are commonplace in offices, enterprise-wide computer networks, intranets, and the Internet.

When used in a LAN networking environment, the computer 220 is connected to the LAN 251 through a network interface or adapter 253. When used in a WAN networking environment, the computer 220 may include a modem 254 or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

Computer 220 may include a variety of computer readable storage media. Computer readable storage media can be any available media that can be accessed by computer 220 and includes both volatile and nonvolatile media, removable and non-removable media. By way of example, and not limitation, computer readable media may comprise computer storage media and communication media. Computer storage media include both volatile and nonvolatile, removable, and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 220. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for enabling machines, such as by a parasitic relationship. A method, system, computer readable storage medium, or apparatus may provide for detecting an outage of the machine (e.g., device); sending (based on the outage) an autonomous vehicle to the machine; and utilizing a function of the autonomous vehicle to address the outage, which may include providing capabilities to the machine. The outage may be a power outage or a communication outage. The function may be associated with powering the machine or installing a satellite communications apparatus or the like communication apparatus to the machine. Wireless power may be used and transferred from the autonomous vehicle to the machine. The autonomous vehicle may use fossil fuels or green energy. All combinations in this paragraph (including the removal or addition of steps) are contemplated in a manner that is consistent with the other portions of the detailed description.

What is claimed is:

1. An apparatus comprising:
   a processor; and
   memory coupled with the processor, the memory storing executable instructions that when executed by the processor cause the processor to effectuate operations comprising:
   detecting an outage associated with a device;
   based on the outage, deploying an autonomous vehicle to a location near the device; and
   utilizing a function of the autonomous vehicle to provide a capability to the device, wherein the function comprises connecting detachable antenna from the autonomous vehicle to the device.

2. The apparatus of claim 1, wherein the apparatus is the autonomous vehicle.

3. The apparatus of claim 1, wherein the outage comprises a power outage.

4. The apparatus of claim 1, wherein the outage comprises a communication outage.

5. The apparatus of claim 1, wherein the capability is associated with powering the device.

6. The apparatus of claim 1, wherein the autonomous vehicle is an aerial vehicle.

7. The apparatus of claim 1, wherein the function comprises connecting a detachable battery from the autonomous vehicle to the device.

8. The apparatus of claim 1, wherein the device is an automated teller machine (ATM).

9. A method comprising:
   detecting an outage associated with a device;
   based on the outage, deploying an autonomous vehicle to a location near the device; and
   utilizing a function of the autonomous vehicle to provide a capability to the device, wherein the function comprises connecting detachable antenna from the autonomous vehicle to the device.

10. The method of claim 9, wherein the outage comprises a power outage.

11. The method of claim 9, wherein the outage comprises a communication outage.

12. The method of claim 9, wherein the capability is associated with powering the device.

13. The method of claim 9, wherein the autonomous vehicle is an aerial vehicle.

14. The method of claim 9, wherein the function comprises connecting a detachable battery from the autonomous vehicle to the device.

15. The method of claim 9, wherein the device is an automated teller machine (ATM).

16. A non-transitory computer readable storage medium storing computer executable instructions that when executed by a computing device cause said computing device to effectuate operations comprising:
   detecting an outage associated with a device;
   based on the outage, deploying an autonomous vehicle to a location near the device; and
   utilizing a function of the autonomous vehicle to provide a capability to the device, wherein the function comprises connecting detachable antenna from the autonomous vehicle to the device.

17. The non-transitory computer readable storage medium of claim 16, wherein the outage comprises a power outage.

18. The non-transitory computer readable storage medium of claim 16, wherein the outage comprises a communication outage.

19. The non-transitory computer readable storage medium of claim 16, wherein the autonomous vehicle is an aerial vehicle.

20. The non-transitory computer readable storage medium of claim 16, wherein the device is an automated teller machine (ATM).

\* \* \* \* \*